(12) United States Patent
Chang et al.

(10) Patent No.: US 10,129,177 B2
(45) Date of Patent: Nov. 13, 2018

(54) INTER-CLOUD BROKER FOR HYBRID CLOUD NETWORKS

(71) Applicant: Cisco Technology, Inc., San Jose, CA (US)

(72) Inventors: David Wei-Shen Chang, Milpitas, CA (US); Chiang Han Yang, Sunnyvale, CA (US); Murali Anantha, Sunnyvale, CA (US); Shashank Vinchurkar, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 109 days.

(21) Appl. No.: 15/161,897

(22) Filed: May 23, 2016

(65) Prior Publication Data
US 2017/0339070 A1 Nov. 23, 2017

(51) Int. Cl.
*H04L 12/66* (2006.01)
*H04L 29/08* (2006.01)
(Continued)

(52) U.S. Cl.
CPC ............ *H04L 47/829* (2013.01); *H04L 12/66* (2013.01); *H04L 41/12* (2013.01); *H04L 67/10* (2013.01);
(Continued)

(58) Field of Classification Search
CPC . H04L 12/4641; H04L 45/306; H04L 45/745; H04L 47/825; H04L 47/829; H04W 12/06; H04W 16/06
See application file for complete search history.

(56) References Cited

U.S. PATENT DOCUMENTS

| 5,812,773 A | 9/1998 | Norin |
| 5,889,896 A | 3/1999 | Meshinsky et al. |

(Continued)

FOREIGN PATENT DOCUMENTS

| CN | 101719930 | 6/2010 |
| CN | 101394360 | 7/2011 |

(Continued)

OTHER PUBLICATIONS

Nair, Srijith K. et al., "Towards secure cloud bursting, brokerage and aggregation," 2012, www.flexiant.com.
(Continued)

*Primary Examiner* — Sargon Nano
(74) *Attorney, Agent, or Firm* — Polsinelli PC

(57) ABSTRACT

A cloud broker gateway interfaces with an enterprise network and one or more public cloud networks, including a first public cloud and a second public cloud. The cloud broker gateway receives a request for one or more computing resources from a tenant associated with the enterprise network, and directs the request to the first public cloud based on a brokerage policy for the tenant. The cloud broker gateway receives a response indicating the first public cloud cannot provide the one or more computing resources, and redirects the request to the second public cloud based on the brokerage policy for the tenant. The cloud broker gateway also establishes a hybrid cloud that provides access to the one or more computing resources between the second public cloud and the enterprise network.

20 Claims, 7 Drawing Sheets

(51) Int. Cl.
*H04L 12/911* (2013.01)
*H04L 12/24* (2006.01)

(52) U.S. Cl.
CPC ........ *H04L 67/141* (2013.01); *H04L 67/2809* (2013.01)

(56) References Cited

U.S. PATENT DOCUMENTS

| | | | |
|---|---|---|---|
| 6,108,782 | A | 8/2000 | Fletcher et al. |
| 6,178,453 | B1 | 1/2001 | Mattaway et al. |
| 6,298,153 | B1 | 10/2001 | Oishi |
| 6,343,290 | B1 | 1/2002 | Cossins et al. |
| 6,643,260 | B1 | 11/2003 | Kloth et al. |
| 6,683,873 | B1 | 1/2004 | Kwok et al. |
| 6,721,804 | B1 | 4/2004 | Rubin et al. |
| 6,733,449 | B1 | 5/2004 | Krishnamurthy et al. |
| 6,735,631 | B1 | 5/2004 | Oehrke et al. |
| 6,996,615 | B1 | 2/2006 | McGuire |
| 7,054,930 | B1 | 5/2006 | Cheriton |
| 7,058,706 | B1 | 6/2006 | Lyer et al. |
| 7,062,571 | B1 | 6/2006 | Dale et al. |
| 7,111,177 | B1 | 9/2006 | Chauvel et al. |
| 7,212,490 | B1 | 5/2007 | Kao et al. |
| 7,277,948 | B2 | 10/2007 | Igarashi et al. |
| 7,313,667 | B1 | 12/2007 | Pullela et al. |
| 7,379,846 | B1 | 5/2008 | Williams et al. |
| 7,480,672 | B2 | 1/2009 | Hahn et al. |
| 7,496,043 | B1 | 2/2009 | Leong et al. |
| 7,536,476 | B1 | 5/2009 | Alleyne |
| 7,567,504 | B2 | 7/2009 | Darling et al. |
| 7,606,147 | B2 | 10/2009 | Luft et al. |
| 7,647,594 | B2 | 1/2010 | Togawa |
| 7,773,510 | B2 | 8/2010 | Back et al. |
| 7,808,897 | B1 | 10/2010 | Mehta et al. |
| 7,881,957 | B1 | 2/2011 | Cohen et al. |
| 7,917,647 | B2 | 3/2011 | Cooper et al. |
| 8,010,598 | B2 | 8/2011 | Tanimoto |
| 8,028,071 | B1 | 9/2011 | Mahalingam et al. |
| 8,041,714 | B2 | 10/2011 | Aymeloglu et al. |
| 8,121,117 | B1 | 2/2012 | Amdahl et al. |
| 8,171,415 | B2 | 5/2012 | Appleyard et al. |
| 8,234,377 | B2 | 7/2012 | Cohn |
| 8,244,559 | B2 | 8/2012 | Horvitz et al. |
| 8,250,215 | B2 | 8/2012 | Stienhans et al. |
| 8,280,880 | B1 | 10/2012 | Aymeloglu et al. |
| 8,284,664 | B1 | 10/2012 | Aybay et al. |
| 8,301,746 | B2 | 10/2012 | Head et al. |
| 8,345,692 | B2 | 1/2013 | Smith |
| 8,406,141 | B1 | 3/2013 | Couturier et al. |
| 8,407,413 | B1 | 3/2013 | Yucel et al. |
| 8,448,171 | B2 | 5/2013 | Donnellan et al. |
| 8,477,610 | B2 | 7/2013 | Zuo et al. |
| 8,495,356 | B2 | 7/2013 | Ashok et al. |
| 8,510,469 | B2 | 8/2013 | Portolani |
| 8,514,868 | B2 | 8/2013 | Hill |
| 8,532,108 | B2 | 9/2013 | Li et al. |
| 8,533,687 | B1 | 9/2013 | Greifeneder et al. |
| 8,547,974 | B1 | 10/2013 | Guruswamy et al. |
| 8,560,639 | B2 | 10/2013 | Murphy et al. |
| 8,560,663 | B2 | 10/2013 | Baucke et al. |
| 8,589,543 | B2 | 11/2013 | Dutta et al. |
| 8,590,050 | B2 | 11/2013 | Nagpal et al. |
| 8,611,356 | B2 | 12/2013 | Yu et al. |
| 8,612,625 | B2 | 12/2013 | Andreis et al. |
| 8,630,291 | B2 | 1/2014 | Shaffer et al. |
| 8,639,787 | B2 | 1/2014 | Lagergren et al. |
| 8,656,024 | B2 | 2/2014 | Krishnan et al. |
| 8,660,129 | B1 * | 2/2014 | Brendel ............. H04L 12/4641 370/397 |
| 8,719,804 | B2 | 5/2014 | Jain |
| 8,775,576 | B2 | 7/2014 | Hebert et al. |
| 8,797,867 | B1 | 8/2014 | Chen et al. |
| 8,805,951 | B1 | 8/2014 | Faibish et al. |
| 8,850,182 | B1 | 9/2014 | Fritz et al. |
| 8,856,339 | B2 | 10/2014 | Mestery et al. |
| 8,909,928 | B2 | 12/2014 | Ahmad et al. |
| 8,918,510 | B2 | 12/2014 | Gmach et al. |
| 8,924,720 | B2 | 12/2014 | Raghuram et al. |
| 8,930,747 | B2 | 1/2015 | Levijarvi et al. |
| 8,938,775 | B1 | 1/2015 | Roth et al. |
| 8,959,526 | B2 | 2/2015 | Kansal et al. |
| 8,977,754 | B2 | 3/2015 | Curry, Jr. et al. |
| 9,009,697 | B2 | 4/2015 | Breiter et al. |
| 9,015,324 | B2 | 4/2015 | Jackson |
| 9,043,439 | B2 | 5/2015 | Bicket et al. |
| 9,049,115 | B2 | 6/2015 | Rajendran et al. |
| 9,063,789 | B2 | 6/2015 | Beaty et al. |
| 9,065,727 | B1 | 6/2015 | Liu et al. |
| 9,075,649 | B1 | 7/2015 | Bushman et al. |
| 9,164,795 | B1 | 10/2015 | Vincent |
| 9,167,050 | B2 * | 10/2015 | Durazzo ............. H04L 63/0281 |
| 9,201,701 | B2 | 12/2015 | Boldyrev et al. |
| 9,201,704 | B2 | 12/2015 | Chang et al. |
| 9,203,784 | B2 | 12/2015 | Chang et al. |
| 9,223,634 | B2 | 12/2015 | Chang et al. |
| 9,244,776 | B2 | 1/2016 | Koza et al. |
| 9,251,114 | B1 | 2/2016 | Ancin et al. |
| 9,264,478 | B2 | 2/2016 | Hon et al. |
| 9,313,048 | B2 | 4/2016 | Chang et al. |
| 9,361,192 | B2 | 6/2016 | Smith et al. |
| 9,380,075 | B2 | 6/2016 | He et al. |
| 9,432,294 | B1 | 8/2016 | Sharma et al. |
| 9,444,744 | B1 | 9/2016 | Sharma et al. |
| 9,473,365 | B2 | 10/2016 | Melander et al. |
| 9,503,530 | B1 * | 11/2016 | Niedzielski ......... H04L 67/1034 |
| 9,558,078 | B2 | 1/2017 | Farlee et al. |
| 9,613,078 | B2 | 4/2017 | Vermeulen et al. |
| 9,628,471 | B1 | 4/2017 | Sundaram et al. |
| 9,658,876 | B2 | 5/2017 | Chang et al. |
| 9,692,802 | B2 | 6/2017 | Bicket et al. |
| 9,755,858 | B2 | 9/2017 | Bagepalli et al. |
| 2002/0073337 | A1 | 6/2002 | Ioele et al. |
| 2002/0143928 | A1 | 10/2002 | Maltz et al. |
| 2002/0166117 | A1 | 11/2002 | Abrams et al. |
| 2002/0174216 | A1 | 11/2002 | Shorey et al. |
| 2003/0018591 | A1 | 1/2003 | Komisky |
| 2003/0056001 | A1 | 3/2003 | Mate et al. |
| 2003/0228585 | A1 | 12/2003 | Inoko et al. |
| 2004/0004941 | A1 | 1/2004 | Malan et al. |
| 2004/0095237 | A1 | 5/2004 | Chen et al. |
| 2004/0131059 | A1 | 7/2004 | Ayyakad et al. |
| 2004/0264481 | A1 | 12/2004 | Darling et al. |
| 2005/0060418 | A1 | 3/2005 | Sorokopud |
| 2005/0125424 | A1 | 6/2005 | Herriott et al. |
| 2006/0104286 | A1 | 5/2006 | Cheriton |
| 2006/0126665 | A1 | 6/2006 | Ward et al. |
| 2006/0146825 | A1 | 7/2006 | Hofstaedter et al. |
| 2006/0155875 | A1 | 7/2006 | Cheriton |
| 2006/0168338 | A1 | 7/2006 | Bruegl et al. |
| 2007/0174663 | A1 | 7/2007 | Crawford et al. |
| 2007/0223487 | A1 | 9/2007 | Kajekar et al. |
| 2007/0242830 | A1 | 10/2007 | Conrado et al. |
| 2008/0005293 | A1 | 1/2008 | Bhargava et al. |
| 2008/0084880 | A1 | 4/2008 | Dharwadkar |
| 2008/0165778 | A1 | 7/2008 | Ertemalp |
| 2008/0198752 | A1 | 8/2008 | Fan et al. |
| 2008/0201711 | A1 | 8/2008 | Amir Husain |
| 2008/0235755 | A1 | 9/2008 | Blaisdell et al. |
| 2009/0006527 | A1 | 1/2009 | Gingell, Jr. et al. |
| 2009/0019367 | A1 | 1/2009 | Cavagnari et al. |
| 2009/0031312 | A1 | 1/2009 | Mausolf et al. |
| 2009/0083183 | A1 | 3/2009 | Rao et al. |
| 2009/0138763 | A1 | 5/2009 | Arnold |
| 2009/0177775 | A1 | 7/2009 | Radia et al. |
| 2009/0178058 | A1 | 7/2009 | Stillwell, III et al. |
| 2009/0182874 | A1 | 7/2009 | Morford et al. |
| 2009/0265468 | A1 | 10/2009 | Annambhotla et al. |
| 2009/0265753 | A1 | 10/2009 | Anderson et al. |
| 2009/0293056 | A1 | 11/2009 | Ferris |
| 2009/0300608 | A1 | 12/2009 | Ferris et al. |
| 2009/0313562 | A1 | 12/2009 | Appleyard et al. |
| 2009/0323706 | A1 | 12/2009 | Germain et al. |
| 2009/0328031 | A1 | 12/2009 | Pouyadou et al. |
| 2010/0042720 | A1 | 2/2010 | Stienhans et al. |

(56) References Cited

U.S. PATENT DOCUMENTS

| | | |
|---|---|---|
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1* | 7/2010 | Mason ............... G06F 17/30088 707/822 |
| 2010/0192157 A1 | 7/2010 | Jackson et al. |
| 2010/0205601 A1 | 8/2010 | Abbas et al. |
| 2010/0211782 A1* | 8/2010 | Auradkar ................ H04L 9/083 713/168 |
| 2010/0293270 A1 | 11/2010 | Augenstein et al. |
| 2010/0318609 A1 | 12/2010 | Lahiri et al. |
| 2010/0325199 A1* | 12/2010 | Park ................... G06F 17/30067 709/203 |
| 2010/0325441 A1 | 12/2010 | Laurie et al. |
| 2010/0333116 A1* | 12/2010 | Prahlad ............. G06F 17/30082 719/328 |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1* | 3/2011 | Parann-Nissany ...... G06F 21/62 726/1 |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0213966 A1 | 9/2011 | Fu et al. |
| 2011/0219434 A1* | 9/2011 | Betz ....................... G06F 21/00 726/5 |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1* | 1/2012 | Lee .................... H04L 63/0209 726/1 |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1* | 3/2012 | Arasaratnam ......... G06F 21/602 726/26 |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0203908 A1* | 8/2012 | Beaty .................... G06F 9/5072 709/226 |
| 2012/0204169 A1* | 8/2012 | Breiter ............... G06F 9/44526 717/171 |
| 2012/0204187 A1* | 8/2012 | Breiter .................. G06F 9/5072 718/105 |
| 2012/0214506 A1 | 8/2012 | Skaaksrud et al. |
| 2012/0222106 A1* | 8/2012 | Kuehl ................ H04L 63/0209 726/11 |
| 2012/0236716 A1 | 9/2012 | Anbazhagan et al. |
| 2012/0240113 A1* | 9/2012 | Hur ..................... G06F 9/45558 718/1 |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1* | 11/2012 | Ellison ................ H04L 41/0233 709/203 |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1* | 3/2013 | Shao ................... H04L 67/1025 709/201 |
| 2013/0069950 A1* | 3/2013 | Adam ................... G06T 11/206 345/440 |
| 2013/0080509 A1* | 3/2013 | Wang ..................... H04L 12/66 709/203 |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185413 A1* | 7/2013 | Beaty .................... G06F 9/5072 709/224 |
| 2013/0185433 A1 | 7/2013 | Zhu et al. |
| 2013/0191106 A1 | 7/2013 | Kephart et al. |
| 2013/0198050 A1* | 8/2013 | Shroff ................ H04L 41/5009 705/34 |
| 2013/0198374 A1 | 8/2013 | Zalmanovitch et al. |
| 2013/0204849 A1* | 8/2013 | Chacko ................... G06F 3/0604 707/692 |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1* | 10/2013 | Chang .................... H04L 49/70 726/12 |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |

(56) References Cited

U.S. PATENT DOCUMENTS

| | | |
|---|---|---|
| 2014/0052877 A1* | 2/2014 | Mao ............... H04L 61/103 709/245 |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1* | 2/2015 | Raghu ................ G06F 9/4856 718/1 |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0105393 A1* | 4/2016 | Thakkar ............ H04L 41/0823 709/220 |
| 2016/0127184 A1 | 5/2016 | Bursell |
| 2016/0134557 A1 | 5/2016 | Steinder et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1* | 9/2016 | Foxhoven ........... H04L 63/0272 |
| 2016/0277368 A1 | 9/2016 | Narayanaswamy et al. |
| 2016/0352682 A1* | 12/2016 | Chang ................ H04L 61/6022 |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0041342 A1* | 2/2017 | Efremov ............. H04L 67/1008 |
| 2017/0054659 A1 | 2/2017 | Ergin et al. |
| 2017/0063674 A1* | 3/2017 | Maskalik ................ H04L 45/38 |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0171158 A1 | 6/2017 | Hoy et al. |
| 2017/0264663 A1 | 9/2017 | Bicket et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Son, Jungmin, "Automatic decision system for efficient resource selection and allocation in inter-clouds," Jun. 2013, http://www.cloudbus.org/.

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Author Unknown, "Real-Time Performance Monitoring on Juniper Networks Devices, Tips and Tools for Assessing and Analyzing Network Efficiency," Juniper Networks, Inc., May 2010, 35 pages.

Beyer, Steffen, "Module "Data:locations?!"," YAPC::Europe, London, UK,ICA, Sep. 22-24, 2000, XP002742700, 15 pages.

Borovick, Lucinda, et al., "Architecting the Network for the Cloud," IDC White Paper, Jan. 2011, 8 pages.

Bosch, Greg, "Virtualization," last modified Apr. 2012 by B. Davison, 33 pages.

Broadcasters Audience Research Board, "What's Next," http://lwww.barb.co.uk/whats-next, accessed Jul. 22, 2015, 2 pages.

Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.

Cisco Systems, Inc., "Cisco Unified Network Services: Overcome Obstacles to Cloud-Ready Deployments," Cisco White Paper, Jan. 2011, 6 pages.

Cisco Systems, Inc., "Cisco Intercloud Fabric: Hybrid Cloud with Choice, Consistency, Control and Compliance," Dec. 10, 2014, 22 pages.

Cisco Technology, Inc., "Cisco Expands Videoscape TV Platform Into the Cloud," Jan. 6, 2014, Las Vegas, Nevada, Press Release, 3 pages.

(56) References Cited

OTHER PUBLICATIONS

CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Amedro, Brian, et al., "An Efficient Framework for Running Applications on Clusters, Grids and Cloud," 2010, 17 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Ye, Xianglong, et al., "A Novel Blocks Placement Strategy for Hadoop," 2012 IEEE/ACTS 11th International Conference on Computer and Information Science, 2012 IEEE, 5 pages.

\* cited by examiner

INTER-CLOUD BROKER FOR HYBRID CLOUD NETWORKS

TECHNICAL FIELD

This disclosure relates generally to communications systems, more particularly, to providing network resources in a hybrid cloud environment.

BACKGROUND

Data centers include a complex network of hardware and software that form "clouds", which may host applications and store large amounts of data for an organization or multiple organizations. An enterprise data center, for example, may be privately owned and discretely provides services for a number of its customers, with each customer using data center resources by way of private networks. Operatively, enterprise data centers provide dynamic "virtual networks" that support server and desktop virtualization. When an enterprise data center runs out of capacity (e.g., storage computing resources, etc.), an enterprise service provider may opt to add more hardware, which results in a direct and permanent increase in data center hardware and/or operational costs. As another option, the enterprise service provider may contract or lease additional computing resources from a public cloud data center, which only temporarily increases hardware and/or operational costs during a lease period. This contract or lease offers numerous advantages and provides a flexible cost structure over simply adding more hardware.

When an enterprise data center shares or leases computing resources from another data center (e.g., such as a public cloud data center), the resultant combination of computing resources is referred to as a "hybrid" cloud. A hybrid cloud generally includes a cloud infrastructure composed of two or more clouds that inter-operate or federate through technology. In essence, a hybrid cloud represents an interaction between private and public clouds where a private cloud joins a public cloud and utilizes public cloud resources in a secure and scalable way. Typically, in a hybrid cloud environment, respective data center resources are shared using an overlay network. Despite numerous advantages offered by hybrid cloud environments, contracting, leasing, coordinating, or otherwise securing additional resources from a public cloud often proves an onerous and complex task.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

Figure 1:
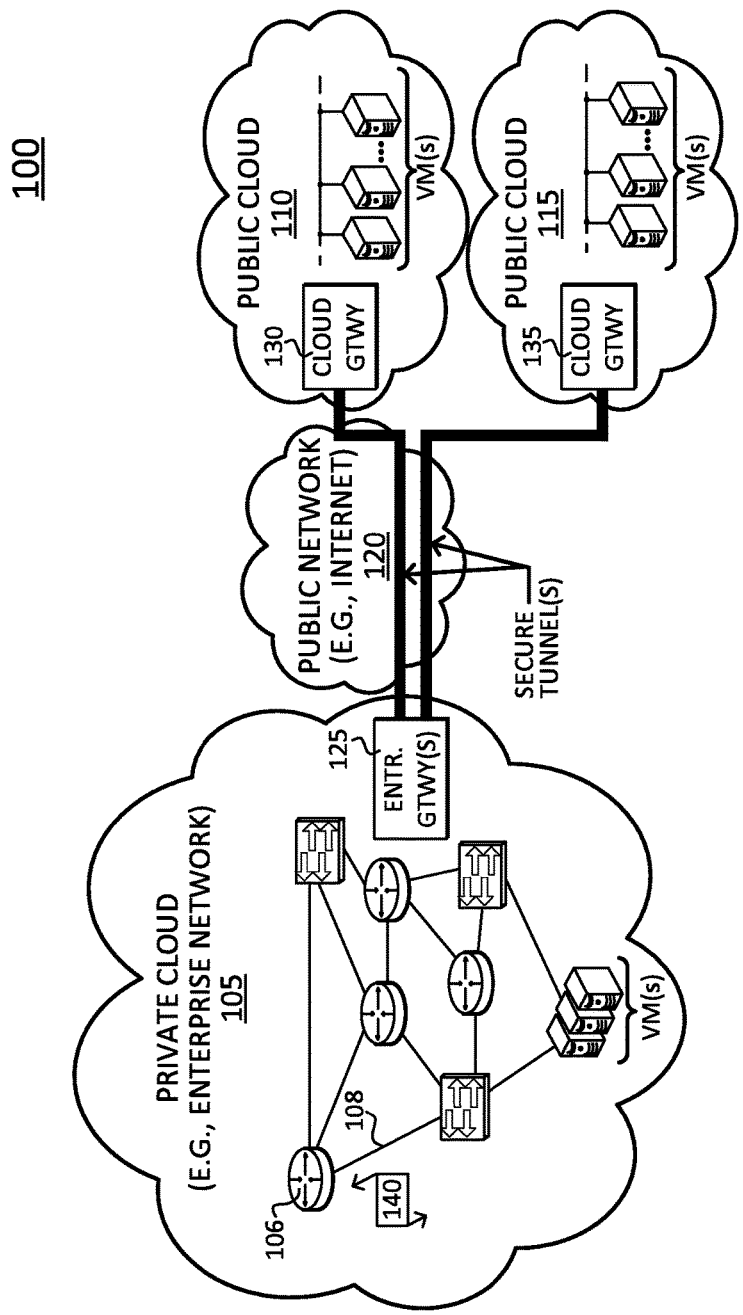
FIG. 1 illustrates an example hybrid cloud network.

According to one or more embodiments of the disclosure, a cloud broker gateway orchestrates and coordinates securing cloud resources in a hybrid cloud environment—e.g., between a private cloud (e.g., enterprise network) and a public cloud (e.g., third party cloud network provider). Specifically, the cloud broker gateway interfaces with the enterprise network and one or more public clouds, including a first public cloud and a second public cloud. The cloud broker gateway receives a request for one or more computing resources from a tenant associated with the enterprise network, and directs the request to the first public cloud based on a brokerage policy for the tenant. The cloud broker gateway receives a response indicating the first public cloud cannot provide the one or more computing resources, and redirects the request to the second public cloud based on the brokerage policy for the tenant. The cloud broker gateway also establishes a hybrid cloud that provides access to the one or more computing resources between the second public cloud and the enterprise network.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As used herein the term "cloud", "cloud network", "public network", including combinations thereof, generally refers to communication networks that are visible and accessible to other devices (and/or users) that reside outside such communication networks. Moreover, for purposes of discussion herein, operations performed by a cloud, a cloud network, and/or a public network generally refer to hardware and/or software such as cloud platforms, application program interfaces (APIs), virtual machines (VMs), hypervisors, switches, routers, and the like, which are hosted by such cloud, cloud network, and/or public network, as is appreciated by those skilled in the art.

A communication network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Cloud computing can be generally defined as Internet-based computing in which computing resources are dynamically provisioned and allocated to client or user computers or other devices on-demand from a collection of resources available via the network (e.g., "the cloud"). Cloud computing resources, for example, can include any type of resource such as computing, storage, and network devices, virtual machines (VMs), etc. For instance, resources may include service devices (firewalls, deep packet inspectors, traffic monitors, etc.), processing devices (brute force processing capability), storage devices (e.g., servers, network attached storages, storage area network devices), etc., and may be used for instantiation of VMs, databases, applications (Apps), etc.

As noted above, a "hybrid cloud" is a cloud network infrastructure composed of two or more cloud networks that inter-operate or federate through technology. Operatively, in a hybrid cloud environment, a private cloud network joins a public cloud network and uses public cloud network resources in a secure and scalable way. In this hybrid cloud environment, many applications remain within corporate or enterprise datacenters, however, certain applications having, for example, dynamic computing requirements, may be migrated over to the public cloud network to use the public cloud network resources. For these certain applications, challenges arise from the complex nature of leasing, coordinating, or otherwise securing the additional infrastructure in the public cloud.

FIG. 1 illustrates an example hybrid cloud environment 100 illustratively comprising a plurality of networks or "clouds", such as one or more private clouds or datacenters 105, e.g., enterprise network, and one or more public clouds 110, 115 separated by a public network 120, such as the Internet.

As shown, the various clouds or networks include nodes/devices 106 (e.g., routers, switches, servers, and the like) interconnected by communication links 108. Communication links 108 may be wired links or shared media (e.g., wireless links, etc.) where certain devices may be in communication with other nodes/devices based on, for example, distance, signal strength, network/node topology, current operational status, location, etc. Data packets 140 (e.g., traffic and/or messages) may be exchanged among the nodes/devices 106 in hybrid cloud environment 100 using predefined network communication protocols as will be understood by those skilled in the art. Those skilled in the art will also understand that any number of computing resources, devices, links, etc. may be used in hybrid cloud environment 100, and that the view shown herein is for simplicity.

As shown, the networks in hybrid cloud environment 100, employ respective cloud gateways—here, private cloud network 105 employs an enterprise gateway 125 which communicates with a cloud gateway 130 in public cloud network 110 and/or a cloud gateway 135 in public cloud network 115. The respective gateways are shown for purposes of illustration, not limitation. It is appreciated that those skilled in the art will understand the gateways represent of hardware and software that operatively interconnect computing resources and orchestrate communications between private cloud network 105 and public cloud(s) 110, 115. Details regarding these and other features of the gateways are described in, for example, U.S. Pat. Nos. 9,203,784 and 8,856,339, which are incorporated herein by reference to their entirety. For example, enterprise gateway 125 may include Virtual Ethernet Modules (VEMs), virtual machines (VMs), switches, distributed virtual switches (DVS), and other hardware/software that operates to establish, manage, and secure tunnels for communications between public and private clouds. Cloud gateways 130, 135 (for respective public clouds 110, 115), similar to enterprise gateway 125, may also include virtual machines (VMs), switches, distributed virtual switches (DVS), and other hardware/software that communicates with private cloud network 105 over respective secure tunnels. Operatively, the gateways (including underlying hardware/software) form an inter-cloud fabric (e.g., an overlay network) that extends enterprise infrastructures, storage capability, computing resources, and the like, to one or more public clouds in order to meet enterprise resource needs. In some embodiments, for example, cloud gateways 130, 135 can employ cloud VEMs (cVEMS) for switching inter-VM traffic between private cloud network 105 and private application VMs (e.g., contained in the public clouds). In these embodiments, the private application VMs (which may include nested VM containers) can execute in public clouds 110, 115 while running private cloud applications.

Figure 2:
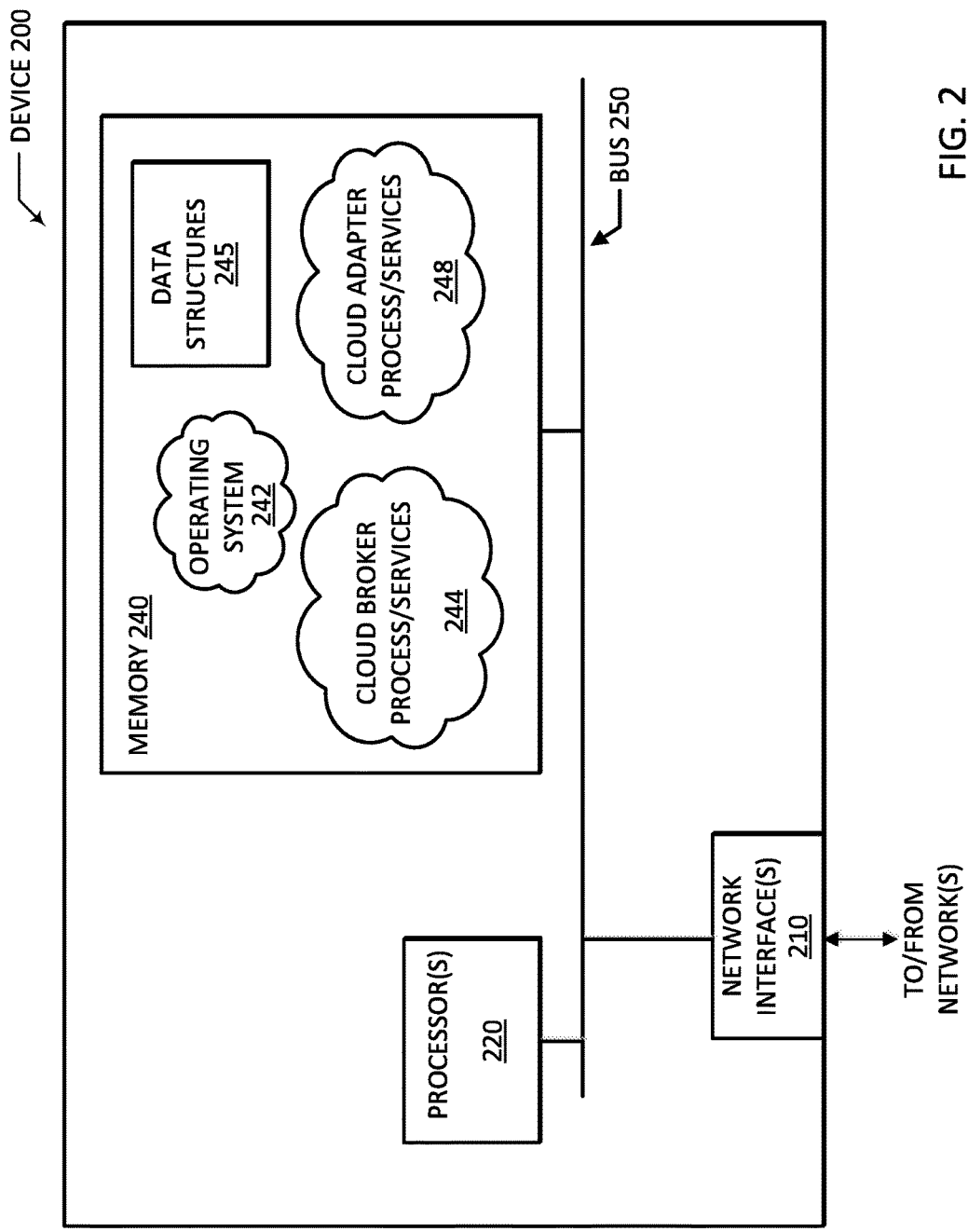
FIG. 2 illustrates an example device, e.g., a cloud broker gateway device.

FIG. 2 is a schematic block diagram of an example simplified computing device 200 that may be used with one or more embodiments described herein, e.g., particularly as a cloud broker gateway, which may operate in conjunction with one or more gateways 125, 130, 135, discussed in greater detail below. The illustrative device 200 may comprise one or more network interfaces 210, at least one processor 220, and a memory 240 interconnected by a system bus 250. Network interface(s) 210 contain the mechanical, electrical, and signaling circuitry for communicating data over links coupled to one or more of the networks shown in hybrid cloud environment 100. Network interfaces 210 may be configured to transmit and/or receive data using a variety of different communication protocols, as will be understood by those skilled in the art. Memory 240 comprises a plurality of storage locations that are addressable by processor 220 for storing software programs and data structures associated with the embodiments described herein. Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of software processes and/or services executing on the device. These software processes and/or services may comprise an illustrative "cloud broker" process/service 244, and an "cloud adapter" process/services 248, as described herein. Note that while processes/services 244 and 248 are shown in centralized memory 240, some embodiments provide for these processes/services to be operated in a distributed computing network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having cloud broker process 244 and/or cloud adapter process 248 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As noted above, certain challenges arise when creating a hybrid cloud environment. For example, dynamic and changing tenant requirements (e.g., on-demand) may complicate coordinating and securing public cloud network infrastructure and computing resources. Further, certain computing resources may be more appropriate from one cloud provider over another cloud provider, based on, for example, an availability of cloud resources, bandwidth, pricing, security, geographic proximity, Quality of Service (QoS) parameters, Service Level Agreements (SLAs), and the like. In this fashion, contracting, leasing, coordinating, or otherwise securing additional resources from a public cloud network often proves an onerous and complex task.

The techniques herein, therefore, provide a cloud broker gateway for hybrid cloud networks, where the cloud broker gateway negotiates and/or coordinates securing computing resources between one or more public cloud(s) 110, 115 and private cloud network 105 (e.g., enterprise network), thus extending private cloud network 105 segments into public cloud datacenters. In this manner, the cloud broker gateway provides a solution to the otherwise onerous and complex task of extending the private cloud network 105 into the public cloud networks 110, 115.

Specifically, according to one or more embodiments of this disclosure, as described in detail below, the cloud broker gateway may receive requests for computing resources from a private cloud network (e.g., private cloud network 105), and negotiate amongst various public clouds networks (e.g., public cloud networks 110, 115) to identify an appropriate public cloud network for securing the computing resources specified in the request. The cloud broker gateway can further coordinate establishing a hybrid cloud between the appropriate public cloud network and the private cloud network. Notably, the cloud broker gateway may be employed as a single node/device and/or it may be employed in a distributed fashion (e.g., residing in each of the various public clouds). In some embodiments, the cloud broker gateway may also include a brokerage policy engine that stores tenant credentials for the various public clouds, ranks or prioritizes the various public clouds by, for example, tenant preferences, Service Level Agreements (SLAs), monitors historical capabilities and performance, maintains consumption statistics per tenant (and for each cloud service), catches responses from the public clouds (e.g., when a public cloud network cannot service a request for computing resources), and re-directs a rejected request to another public cloud. In further embodiments, the cloud broker gateway may map rejected requests to an event trigger, which causes the cloud broker to redirect the rejected request to another public cloud. In this fashion, the cloud broker gateway can provide a seamless transition for extending private clouds into public clouds, thus establishing a hybrid cloud environment.

Illustratively, the techniques described herein may be performed by hardware, software, and/or firmware, such as in accordance with the illustrative cloud broker process 244 and/or the illustrative cloud adapter process 248, which may contain computer executable instructions executed by the processor 220 to perform functions relating to the techniques described herein. For example, the techniques herein may be treated as extensions to conventional cloud management protocols, and as such, may be processed by similar components and devices understood in the art that execute those protocols, accordingly.

Figure 3:
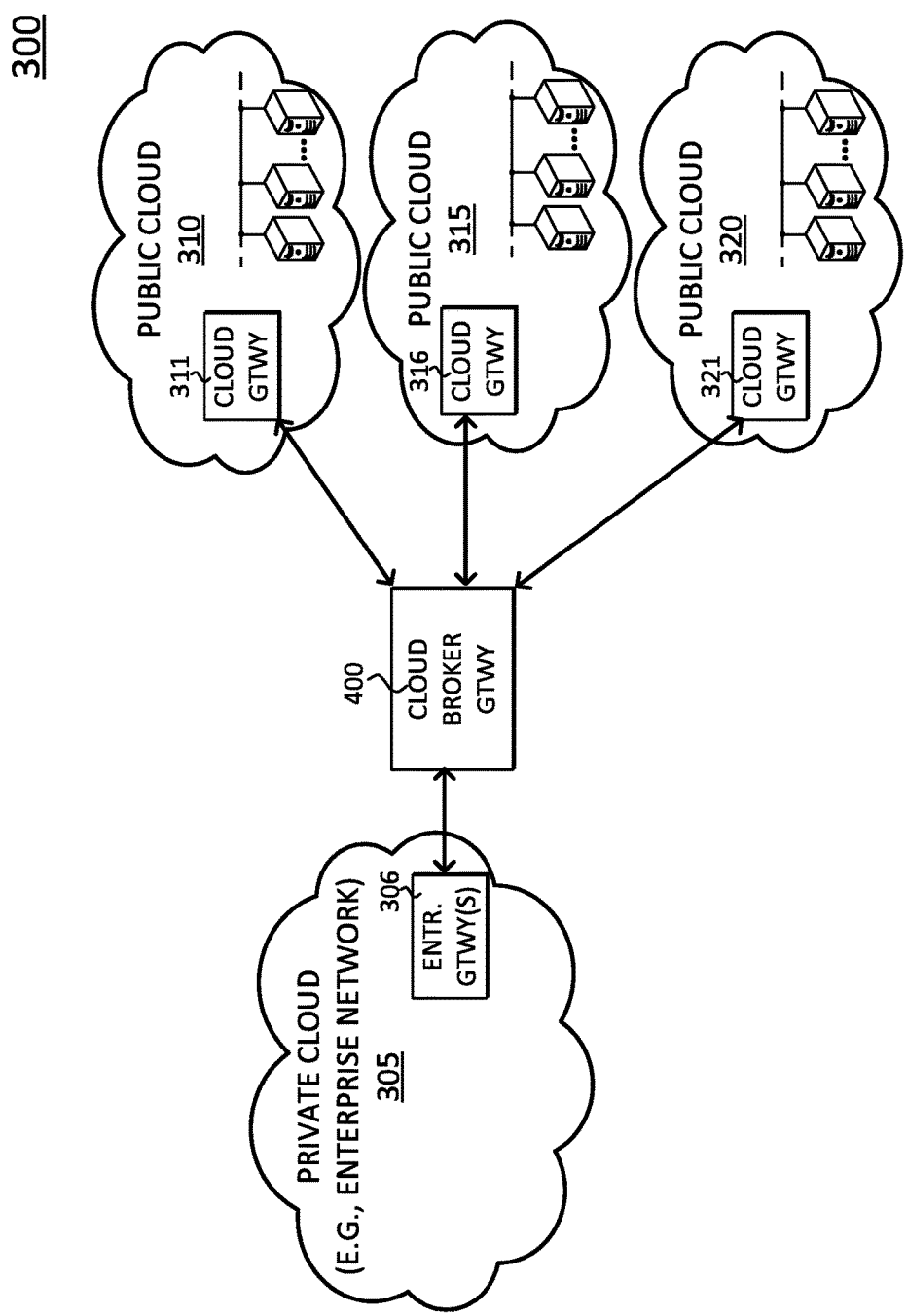
FIG. 3 illustrates another example hybrid cloud network, showing a cloud broker gateway that interfaces between a private cloud network and one or more public cloud networks.
Figure 6:
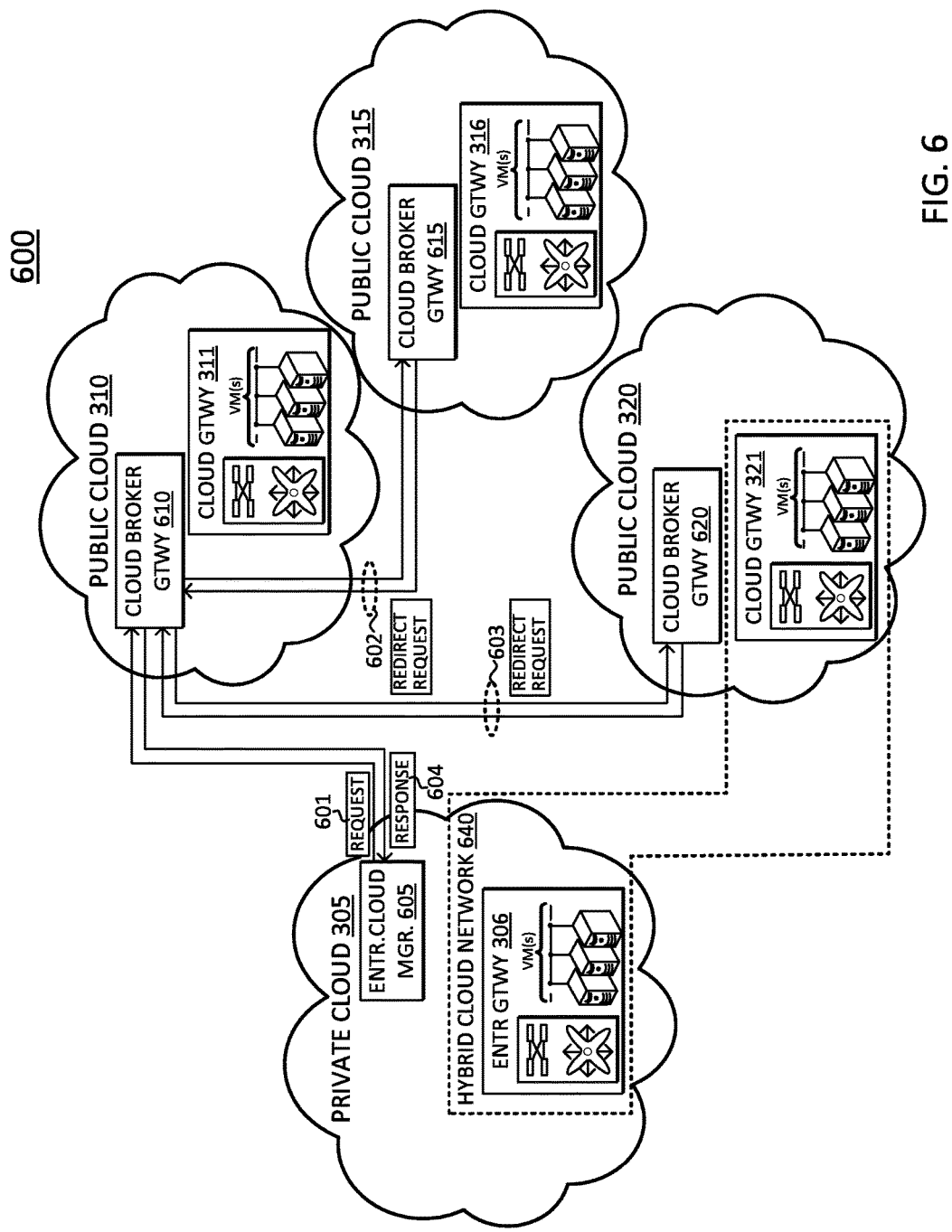
FIG. 6 illustrates another example hybrid cloud environment, showing distributed cloud broker gateway system.

FIG. 3 is an example hybrid cloud environment 300, showing a cloud broker gateway 400 that interfaces with private cloud network 305 (e.g., enterprise network) and one or more public clouds 310, 315, and 320. Cloud broker gateway 400 operatively acts as a broker or proxy for securing cloud resources and establishing a hybrid cloud instance between private cloud network 305 and one or more of the public clouds 310, 315 and/or 320. In this fashion, cloud broker gateway 400 supports operational and management policies for establishing hybrid cloud environments. Notably, as shown, cloud broker gateway 400 is shown as a single device, however, as discussed in greater detail below (e.g., ref. FIG. 6), cloud broker gateway 400 may operate in a distributed computing system and/or a platform hosted by each of the public clouds (e.g., public clouds 310, 315, and 320). However, for purposes of discussion, the cloud broker gateway(s) is/are shown as a single cloud broker gateway 400 in hybrid cloud environment 300.

As discussed above, conventional techniques to establish a hybrid cloud environment are often complex and onerous, and may require enterprise administrators to setup and register accounts with each individual cloud provider in order to subscribe and secure cloud services.

According to the techniques disclosed herein, a cloud broker gateway, such as cloud broker gateway 400, can consolidate and store tenant credentials for each public cloud service provider and act as a proxy, using those tenant credentials, when securing computing resources from respective public cloud networks. Cloud broker gateway 400 may also monitor consumption statistics for each tenant, which may indicate services consumed over the time period by the tenant from corresponding public cloud networks.

Operatively, cloud broker gateway 400 receives a request from a tenant associated with private cloud network 305 (e.g., enterprise network) for one or more computing resources (e.g., when, for example, private cloud network 305 is out of resources). Cloud broker gateway 400 directs the request to one of the various public clouds—e.g., public cloud network 310—based on a brokerage policy for the tenant (e.g., of the enterprise network). Cloud broker gateway 400 also receives (e.g., catches) a response from public cloud network 310 to the request and determines if public cloud network 310 can service the request (e.g., if the public cloud network has capacity, bandwidth, resources, etc.). If public cloud network 310 cannot service the request, cloud broker gateway 400 re-directs the request to a second public cloud network—e.g., public cloud network 315—based on the brokerage policy for the tenant. If the second public cloud, here, public cloud network 315, can service the request for computing resources, cloud broker gateway 400 establishes a hybrid cloud network that provides access to the one or more computing resources between the second public cloud network and the enterprise network.

Figure 4:
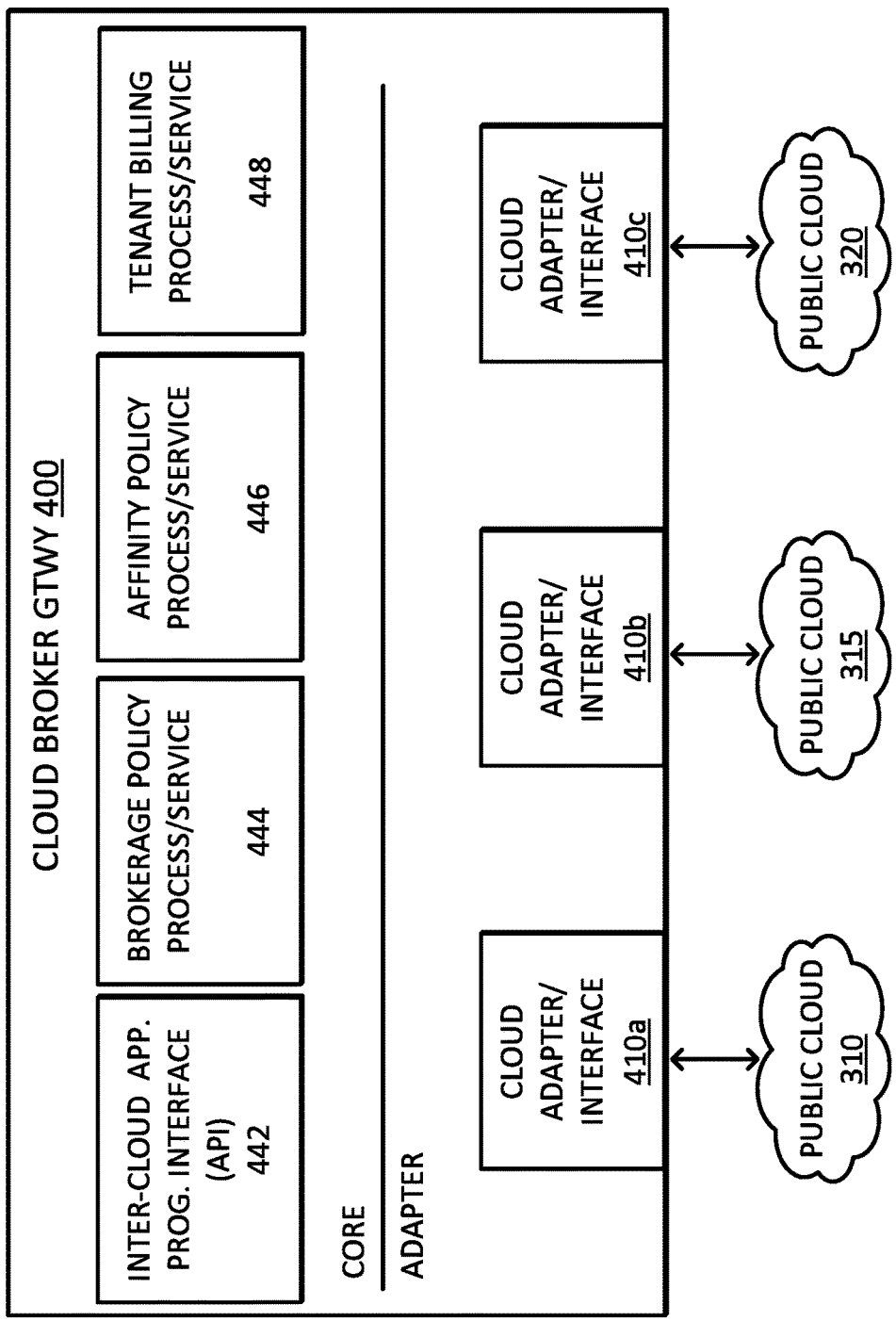
FIG. 4 illustrates an example cloud broker gateway device.

FIG. 4 is an example representation of cloud broker 400. As shown, cloud broker gateway 400 includes various core modules and adapter modules. Specifically, the core modules include an inter-cloud application programming interface (API) 442, brokerage policy process/service 444, an affinity policy process/service 446, and a tenant billing process/service 448. The adapter modules include adapters 410a, 410b, 410c (collectively 410), that interface with respective public clouds—e.g., public cloud network 310, public cloud network 315, public cloud network 320.

Inter-cloud API process 442 represents a set of routines, protocols, and tools for integrating cloud broker gateway 400 with various cloud infrastructure platforms (e.g., OpenStack, Cloudstack, VMware vCloud Director, and the like). Operatively, inter-cloud API 442 provides an outward facing graphical interface that allows customers (e.g., users, tenants, administrators, etc.) to programmatically manage workloads in a hybrid cloud environment, integrates customers with their management system of choice, and provides detailed application management, including policy and governance, application design, and the like, as is appreciated by those skilled in the art. Inter-cloud API process 442 is a module that represents routines, protocols, and tools for building, modifying, and executing certain functions of cloud broker gateway 400, as discussed herein. In this fashion, inter-cloud API process 442 provides a transparent interface between private cloud network 305 (e.g., enterprise network) and various public clouds—e.g., public cloud network 310, 315, and 320, etc.

Brokerage policy process/service 444 represents a module that provides a seamless transition for extending private network 305 into a public cloud network to create a seamless hybrid cloud environment or network. Brokerage policy process 444 coordinates securing computing resources for private network 305 from one or more alternative public cloud networks—e.g., public cloud networks 310, 315, and 320, etc. For example, brokerage policy process 444 can request computing resources from public clouds, receive responses from the cloud service providers (e.g., acknowledging or accepting the request, and/or rejecting the request), map rejections to trigger events that cause cloud broker gateway 400 to redirect the request to other, alternate cloud service providers, and secure the computing resources from one of the alternate cloud service providers. Regarding the alternate cloud service providers, cloud brokerage policy process 444 may also prioritize each alternate cloud provider according to various criteria, including, for example, tenant preferences, Service Level Agreements (SLAs), historical capabilities and performance of respective cloud service providers, billing practices, and the like. In some embodiments, brokerage policy process 444 may also execute specific troubleshooting policies, including cloud specific procedures and tools that facilitate troubleshooting hybrid cloud environments.

Operatively, brokerage policy process 444, either alone or in conjunction with one or more of the modules/processes shown, provides a framework for administrators to setup, manage, and control cloud brokerage operations. Specifically, brokerage policy process 444, when executed by cloud broker gateway 400, operates to receive requests for computing resources from tenants in a private cloud network (e.g., enterprise network), and coordinates amongst public cloud networks to secure the computing resources and establish a hybrid cloud network. With regard to coordinating amongst the public cloud networks, brokerage policy process 444 can direct and re-direct the tenant request (e.g., using respective tenant credentials for each public cloud service stored in inter-cloud API 442) public cloud networks that can service the requested computing resources. In this fashion, brokerage policy process 444 can receive responses from public cloud networks, e.g., response return codes, representational state transfer (REST) return codes, and the like, and perform additional cloud broker re-direction functions. For example, in some embodiments, specific response return codes (e.g., a HTTP Return Code: 307 Temporary Redirect) may be used by cloud service providers to indicate a particular public cloud service provider cannot service the computing resources included in a request. The specific response return code(s) may cause or trigger the brokerage policy process 444 to determine a tenant-mapping or a tenant-priority for alternative cloud service providers, and redirect the request accordingly.

Affinity policy process/service 446 operates in conjunction with brokerage policy process/service 444 and ensures cloud resources allocated for a particular hybrid cloud network are secured from the same cloud network. For example, in some instances, performance and workload security (amongst other factors) may require computing resources be secured from a single public cloud. Affinity policy process 446 validates and enforces resource affinity (e.g., from a single public cloud) for tenants in a hybrid cloud environment.

In operation, if a hybrid cloud network exists between private cloud network 305 and public cloud network 315, affinity policy process 446 may tag the resources in the hybrid cloud network with an origin identifier of the public cloud network—here, public cloud network 315. Affinity policy process 446 may further police brokerage policy process 444, based on the origin identifier, and direct additional requests for computing resources to the same public cloud network—i.e., public cloud network 315. In the event public cloud network 315 cannot service the request, cloud broker gateway 400 can send a notification to the tenant of private cloud network 305 indicating the existing hybrid cloud environment cannot service the request. Alternatively, cloud broker gateway 400 may determine another public cloud network—e.g., public cloud network 320—can service the additional request as well support the underlying resource consumption, migrate the resources to public cloud network 320, and establish a new hybrid cloud environment between private cloud network 305 and public cloud network 320. Notably, certain situations may not require such affinity for cloud resources from a single cloud service provider. In these situations, cloud broker gateway 400 may establish multiple hybrid cloud environments and distribute computing resources across multiple public clouds, as is appreciated by those skilled in the art. In one or more alternative embodiments, certain situations may not require such affinity for cloud resources from a single cloud service provider. In these situations, cloud broker gateway 400 may establish multiple hybrid cloud environments and distribute computing resources across multiple public clouds, as is appreciated by those skilled in the art.

Cloud broker gateway 400, also includes a tenant billing process/service 448 for mapping and billing tenants based on consumption of cloud computing resources. Tenant billing process 448 monitors tenant consumption of cloud resources for each cloud service provider over a time period. In some embodiments, tenant billing process 448 operates in conjunction with brokerage policy process 444 to prioritize cloud service providers according to cost (or other tenant-specific billing policies).

Generally, tenant billing process 448 generates bills or invoices for tenants according to rates set by the cloud service providers. Tenant billing process 448 may accommodate various billing arrangements, including, for example, 1-to-M billing and/or 1-to-1 billing. In 1-M billing, tenant billing process 448 aggregates consumption of cloud resources under a shared tenant account (for tenants that use services of a particular public cloud network), and determines tenant-specific consumptions rates/statistics to calculate appropriate charges. Alternatively, tenant billing process 448 may perform 1-1 billing, where consumption of cloud resources by individual accounts (e.g., one account for each tenant-cloud pair) are maintained/monitored. In 1-1 billing, tenant billing process 448 calculates appropriate charges per each individual tenant account, as is appreciated by those skilled in the art.

In this fashion, cloud broker gateway 400 employs the above discussed core modules and/or adapter modules to orchestrate and/or otherwise coordinate a hybrid cloud environment(s) between, for example, private cloud network 305 and one or more public clouds 310, 315 and/or 320.

Figure 5:
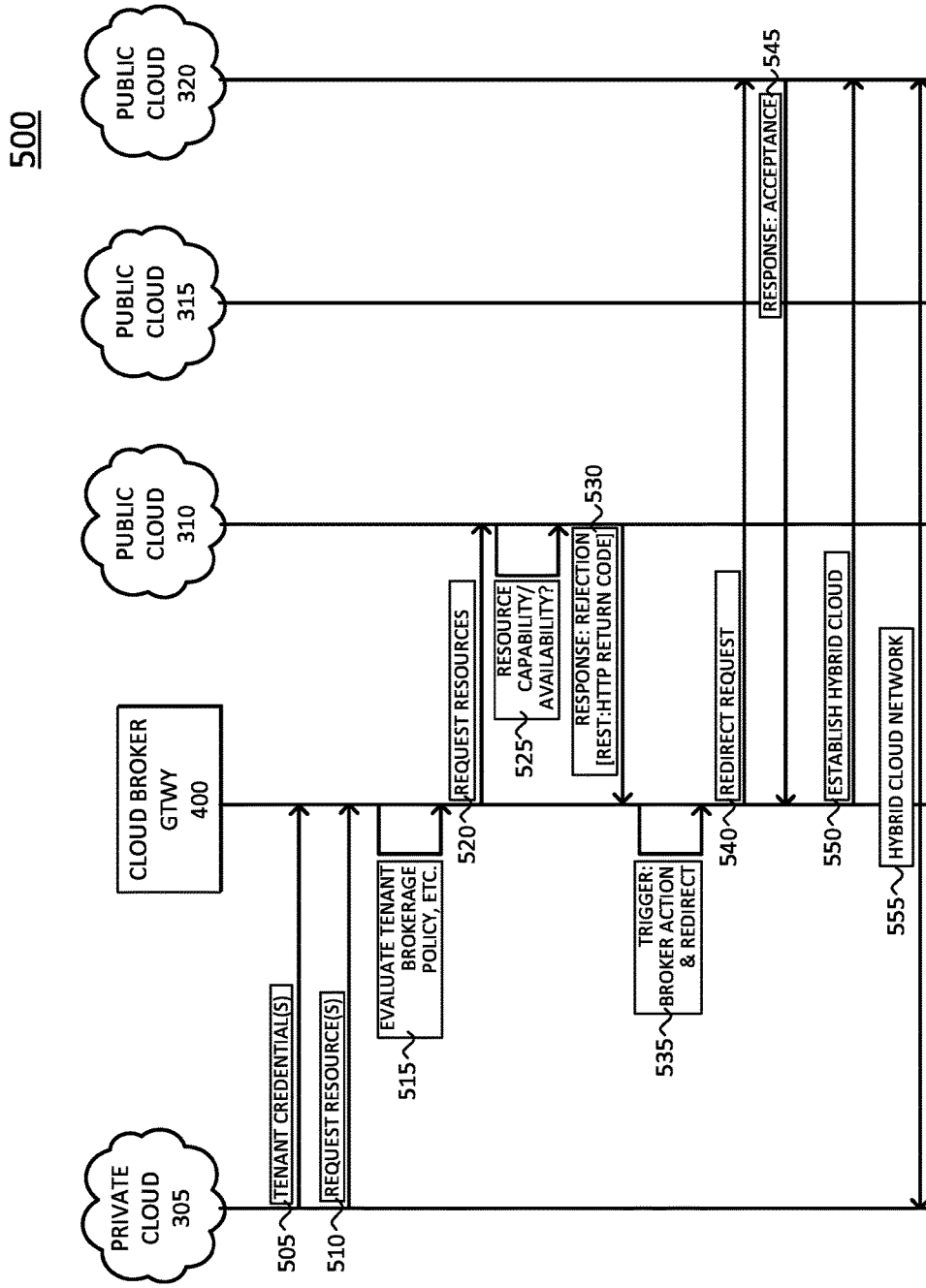
FIG. 5 illustrates a signaling diagram showing cloud broker gateway operations.

Turning now to FIG. 5, a signaling diagram 500 shows an exemplary cloud broker gateway 400 operations for establishing a hybrid cloud between private cloud network 305 and public cloud network 320. Notably, for purposes of illustration, not limitation, signaling diagram 500 shows private cloud network 305, cloud broker gateway 400, and public clouds 310, 315 and 320, but it does not show underlying hardware/software modules in the respective clouds.

Referring to signaling diagram 500, private cloud network 305 sends tenant credentials (505) to cloud broker gateway 400. As discussed above, the tenant credentials may include login and/or account information for cloud service providers (e.g., public clouds). Typically, cloud broker gateway 400 uses the tenant credentials and acts as a proxy for private cloud network 305 when requesting resources from the public clouds. For example, private cloud network 305 sends a request for resources (510) to cloud broker gateway 400. Cloud broker gateway 400 receives the request, and evaluates (515) the tenant brokerage policy (in conjunction with other modules/processes discussed above) and determine an appropriate cloud service provider.

Cloud broker gateway 400 further requests the resources (520) from public cloud network 310 (e.g., using the tenant credentials provided at 505). In response, public cloud network 310 determines its resource capability (or availability) (525), and sends a response (530) to cloud broker gateway 400. Notably, the response here includes a specific representational state transfer (REST) return code—e.g., a "HTTP Return Code: 307 Temporary Redirect". This response (530), including the REST return code, triggers a broker action and redirection (535) by cloud broker gateway 400. In particular, cloud broker gateway 400 catches the response return code, and determines an alternate public cloud service provider based on, for example, a priority of cloud service providers for the tenant.

Cloud broker gateway 400 further re-directs the request (540) to another cloud service provider—e.g., public cloud network 320—based on the priority of cloud service providers for the tenant. Public cloud network 320 evaluates its resources (not shown) and sends a response (545) to cloud broker gateway 400—here, an acceptance to service the request.

Cloud broker gateway 400 receives the response and performs operations to establish a hybrid cloud instances (550) between public cloud network 320 and private cloud 305—e.g., a hybrid cloud network is established (550).

FIG. 6 illustrates a hybrid cloud environment 600, showing hardware and/or software that coordinate establishing a hybrid cloud environment between an enterprise network and one or more public clouds. As discussed above, the cloud broker gateway(s) discussed herein may operate in a distributed system and/or a platform, where each cloud service provider hosts its own cloud broker gateway. In this fashion, each cloud broker gateway can serve as a request proxy for pre-processing respective requests and responses for cloud resources. In such a distributed environment, the cloud broker gateways exchange updates and/or generally maintain updated records for tenant-specific data (e.g., tenant credentials, cloud service provider preferences (priority), billing, and the like). In addition, in this distributed system, private cloud network 305 includes an enterprise cloud manager 605 that interfaces and communicates with cloud brokers 610, 615, and/or 620, hosted in respective public clouds 310, 315, and 320.

As shown, enterprise cloud manager 605 sends a request 601 to cloud broker gateway 610, which is hosted by public cloud network 310. Cloud broker gateway 610 determines public cloud network 310 cannot service the request, and redirects the request (e.g., redirected request 602) to public cloud network 315 based on, for example, its brokerage policy process/service, affinity policy process/service, and the like. Cloud broker gateway 615 receives the redirected request 602, determines public cloud network 315 cannot service the request, and sends a response/rejection (e.g., a rejection code such as an HTTP return code) to cloud broker gateway 610 indicating the same.

Cloud broker gateway 615 further determines that its brokerage policy process for a tenant associated with the initial request 601 provides a third option for securing cloud computing resources—here, public cloud network 320. Accordingly, cloud broker gateway 615 redirects the request (e.g., redirected request 603) to a cloud broker gateway 620 hosted by public cloud network 320. Cloud broker gateway 620 receives redirected request 603, determines public cloud network 320 can service the request, and sends a response to cloud broker gateway 610 indicating the same.

Cloud broker gateway 610 then sends a response 604 to enterprise cloud manager 605 indicating public cloud 320 can service the request. Subsequently, enterprise cloud manager 605 and cloud broker gateway 620 establish a hybrid cloud network 640 between enterprise gateway 306 and cloud broker gateway 321.

Hybrid cloud network 640 extends resources beyond private cloud network 305 into public cloud network 320, with enterprise cloud manager 605 operating in conjunction with the respective cloud broker gateways to provision the requested computing resources. As is appreciated by those skilled in the art, hybrid cloud network 640 may represent an overlay network between private cloud network 305 and public cloud network 320. It is also appreciated that the illustrated component blocks representing enterprise cloud manager 605, the respective cloud broker gateways 615, 615, and 620, respective gateways 306, 311, 316, 321, and the like, are shown for purposes of illustration, not limitation. The various component blocks may include specific network elements, including computers, network appliances, servers, storage devices, computation devices, routers, switches, gateways, bridges, load balancers, firewalls, processors, modules, or any other suitable device, component, element, or object operable to exchange information in a network environment. Moreover, the various component blocks may include any suitable hardware, software, components, modules, interfaces, or objects that facilitate the operations thereof. This may be inclusive of appropriate algorithms and communication protocols that allow for the effective exchange of data or information.

Enterprise cloud manager 605 and/or the respective cloud broker gateways address the dynamic (e.g., on-demand) and often complex task of securing cloud-based resources and establishing secure hybrid cloud environments. In this fashion, the respective cloud broker gateways can transparently and seamlessly accommodate tenant requests for cloud-based services and, in some embodiments, even provide tenants with information from respective cloud service providers such as discounts, unique service offerings (e.g., file-sharing, big data, etc.), and the like.

Figure 7:
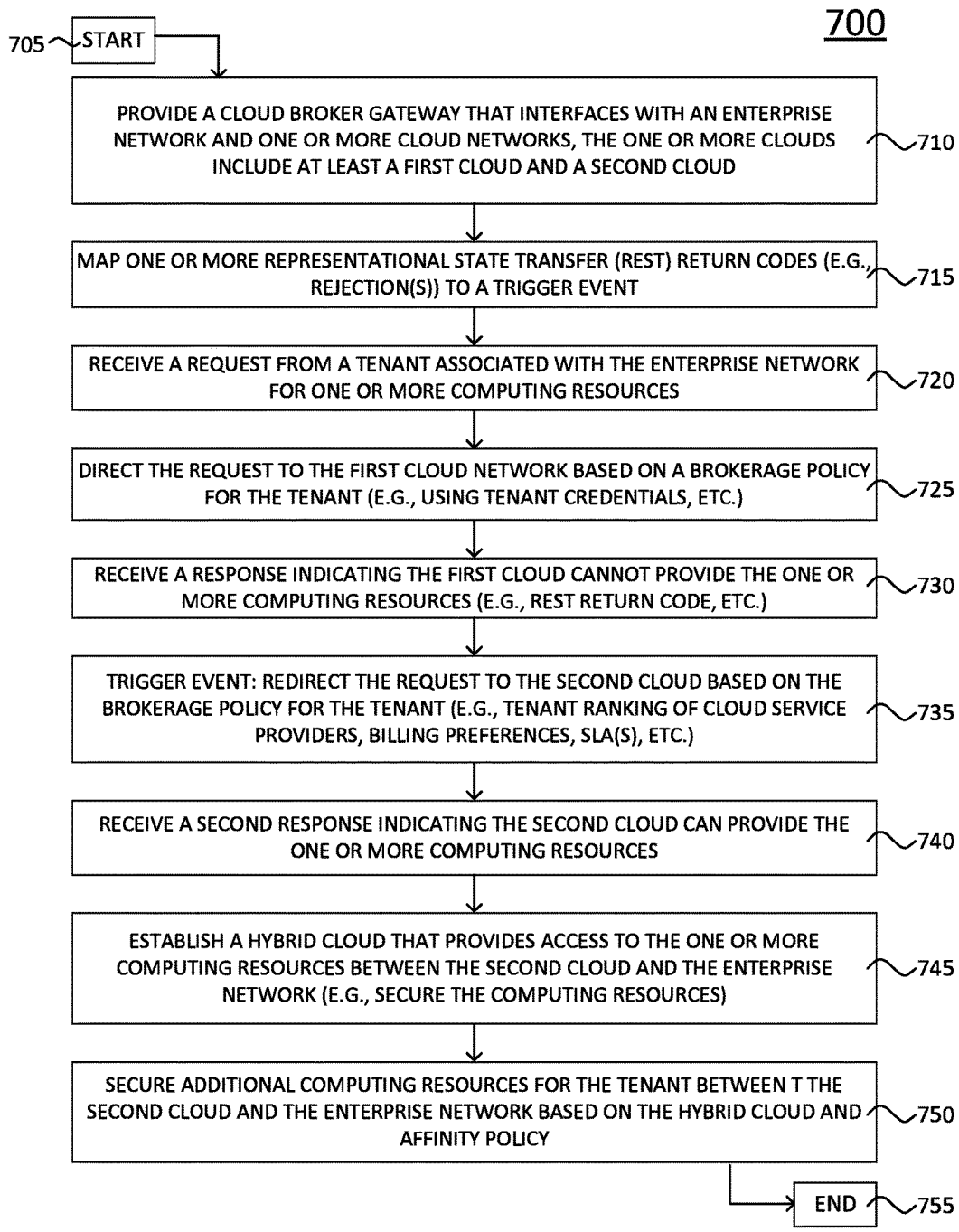
FIG. 7 illustrates an example simplified procedure for establishing a hybrid cloud environment, particularly from the perspective of a cloud broker gateway device.

FIG. 7 illustrates a simplified procedure 700 for dynamically provisioning cloud-based resources and establishing a hybrid cloud environment in accordance with one or more embodiments described herein. Procedure 700 illustrates operations from the perspective of a cloud broker gateway. Procedure 700 begins at step 705 and continues on to step 710 where, as discussed above, a cloud broker gateway interfaces with an enterprise network and one or more clouds (e.g., public cloud networks). In particular, the one or more clouds may include a first cloud and a second cloud.

As described above, the cloud broker gateway may map, at step 715, one or more return codes to a trigger event such as a broker re-direction event (when, for example, a request for resources is rejected by a cloud service provider). The cloud broker gateway further receives, at step 720, a request from a tenant associated with the enterprise network for one or more computing resources. In response, the cloud broker gateway directs, at step 725, the request to one of the clouds based on a brokerage policy for the tenant (e.g., a priority mapping, bandwidth, pricing, security, geographic proximity, Quality of Service (QoS) parameters, Service Level Agreements (SLAs), and the like). Here, the cloud broker gateway directs the request to the first cloud.

The first cloud evaluates its capability and sends a response, which is received by the cloud broker gateway at step 730. As shown, the response indicates the first cloud cannot provide the one or more computing resources. As discussed above, the response may include a specific REST return code, which represents a trigger event, at step 735. In particular, the trigger event causes the cloud broker gateway to re-direct the request to the second cloud, which second cloud may be selected based on the tenant cloud brokerage policy, discussed above. The cloud broker gateway further receives a second response, at step 740, indicating the second cloud can provide the one or more computing resources. Following the second response, the cloud broker gateway coordinates or otherwise establishes a hybrid cloud at step 745 between the enterprise network and the second cloud.

In some embodiments, as discussed above, the cloud broker gateway may also include an affinity policy, which ensures cloud resources allocated for a particular hybrid cloud network are secured from the same cloud. For example, in step 750, the cloud broker gateway may receive one or more additional requests for computing resources and, according to the affinity policy, the cloud broker gateway may secure the computing resources indicated by the additional request from the same cloud—here, the second cloud. Procedure 700 may illustratively end at step 755, or it may continue receive additional requests from tenants and establish respective hybrid cloud environments accordingly. Optionally, the cloud broker gateway may also terminate the hybrid cloud environment (e.g., based on a termination request from a tenant).

It should be noted that while certain steps within procedure 700 may be optional, and further, the steps shown in FIG. 7 are merely examples for illustration—certain other steps may be included or excluded as desired. Further, while a particular order of the steps is shown, this ordering is merely illustrative, and any suitable arrangement of the steps may be utilized without departing from the scope of the embodiments herein.

The techniques herein provide a cloud broker gateway that provides a seamless way for tenants to request cloud-based resources and for establishing hybrid cloud environments. These techniques may operate on-demand and provide a flexible and scalable framework for extending enterprise networks into public cloud networks. These techniques are transparent to enterprise tenants and allow administrators an ability to manage cloud resource allocation amongst multiple cloud service providers (e.g., prioritize preferences), specify certain cloud billing options, and maintain secure hybrid cloud environments based on affinity policies.

While there have been shown and described illustrative embodiments that cloud broker gateway functions, it is to be understood that various other adaptations and modifications may be made within the spirit and scope of the embodiments herein. For example, the embodiments have been shown and described herein with relation to one hybrid cloud between an enterprise network and a public cloud. However, the embodiments in their broader sense are not as limited, and may, in fact, be used with any number of enterprise networks, public clouds, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
  providing a cloud broker gateway that interfaces with an enterprise network and one or more public clouds, the one or more public clouds include at least a first public cloud and a second public cloud;
  receiving, by the cloud broker gateway, a request from a tenant associated with the enterprise network for one or more computing resources;
  directing, by the cloud broker gateway, the request to the first public cloud based on a brokerage policy for the tenant;
  receiving, by the cloud broker gateway, a response indicating the first public cloud cannot provide the one or more computing resources;
  redirecting, by the cloud broker gateway, the request to the second public cloud based on the brokerage policy for the tenant when the response indicates the first public cloud cannot provide the one or more computing resources; and
  establishing, by the cloud broker gateway, a hybrid cloud that provides access to the one or more computing resources between the second public cloud and the enterprise network, the cloud broker gateway configured to act as a proxy for the tenant to dynamically secure the one or more computing resources.

2. The method of claim 1, further comprising:
  receiving, by the cloud broker gateway, a second response indicating the second public cloud can provide the one or more computing resources.

3. The method of claim 2, wherein establishing the hybrid cloud further comprises securing the one or more computing resources for the tenant from the second public cloud.

4. The method of claim 1, wherein the response indicating the first public cloud cannot provide the one or more computing resources includes a representational state transfer (REST) return code.

5. The method of claim 1, further comprising:
  mapping, by the cloud broker gateway, one or more representational state transfer (REST) return codes to a trigger event that causes the cloud broker gateway to redirect the request to one of the one or more public clouds, and
  wherein the response indicating the first public cloud cannot provide the one or more computing resources includes at least one REST return code.

6. The method of claim 1, further comprising:
  receiving, by the cloud broker gateway, one or more tenant credentials for at least the first public cloud and the second public cloud,
  wherein, directing the request to the first public cloud further comprises, directing the request to the first public cloud using the one or more tenant credentials for the first public cloud, and
  wherein, redirecting the request to the second public cloud, further comprises redirecting the request to the public second public cloud using the one or more tenant credentials for the second public cloud.

7. The method of claim 1, further comprising:
  receiving, by the cloud broker gateway, a second request from the tenant associated with the enterprise network for at least one additional computing resource;
  determining, by the cloud broker gateway, the hybrid cloud is established between the second public cloud and the enterprise network; and
  directing, by the cloud broker gateway, the second request to the second public cloud based on an affinity policy when the hybrid cloud is established between the second public cloud and the enterprise network.

8. The method of claim 1, further comprising:
  registering, by the cloud broker gateway, a shared tenant account to access resources at least at the first public cloud;
  receiving, by the cloud broker gateway, a charge for the shared tenant account, the charge indicates services provided by the first public cloud over a time period;
  determining consumption statistics for each tenant associated with the shared tenant account, the consumption statistics; and
  generating, by the cloud broker gateway, an invoice for each tenant, the invoice for each tenant corresponds to the consumptions statics for said each tenant.

9. The method of claim 1,
  registering, by the cloud broker gateway, an individual tenant account for accessing resources at least at the first public cloud;
  receiving, by the cloud broker gateway, a charge for the individual tenant account, the charge indicates services provided by the first public cloud over a time period; and
  generating, by the cloud broker gateway, an invoice for a tenant associated with the individual tenant account based on the charge.

10. The method of claim 1, further comprising:
  determine a priority for selecting the public cloud service providers based on a tenant preference; and
  incorporate the priority in the brokerage policy for the tenant.

11. The method of claim 1, further comprising:
  receiving, by the cloud broker gateway, a termination request from the tenant regarding the one or more computing resources; and
  terminating, by the cloud broker gateway, the hybrid cloud in response to the termination request.

12. A cloud broker gateway device configured to act as a proxy for a tenant to dynamically secure one or more computing resources on behalf of the tenant, the device comprising:
  one or more network interfaces to communicate with an enterprise network and one or more public clouds, the one or more public clouds include at least a first public cloud and a second public cloud;
  a processor coupled to the network interfaces and adapted to execute one or more processes; and
  a memory configured to store a process executable by the processor, the process, when executed, is operable to:
    receive a request from the tenant associated with the enterprise network for the one or more computing resources;

direct the request to the first public cloud based on a brokerage policy for the tenant;

receive a response indicating the first public cloud cannot provide the one or more computing resources;

redirect the request to the second public cloud based on the brokerage policy for the tenant when the response indicates the first public cloud cannot provide the one or more computing resources; and establish a hybrid cloud that provides access to the one or more computing resources between the second public cloud and the enterprise network.

13. The cloud broker gateway device of claim 12, wherein the process, when executed by the processor, is further operable to:

receive a second response indicating the second public cloud can provide the one or more computing resources.

14. The cloud broker gateway device of claim 13, wherein the process to establish the hybrid cloud is further operable to secure the one or more computing resources for the tenant from the second public cloud.

15. The cloud broker gateway device of claim 12, wherein the response indicating the first public cloud cannot provide the one or more computing resources includes a representational state transfer (REST) return code.

16. The cloud broker gateway device of claim 12, wherein the process, when executed by the processor, is further operable to:

map one or more representational state transfer (REST) return codes to a trigger event, the trigger event causes the cloud broker gateway device to redirect the request to one of the one or more public clouds, and wherein the response indicating the first public cloud cannot provide the one or more computing resources includes at least one REST return code.

17. The cloud broker gateway device of claim 12, wherein the process, when executed by the processor, is further operable to:

receive one or more tenant credentials for at least the first public cloud and the second public cloud, wherein, directing the request to the first public cloud further comprises, directing the request to the first public cloud using the one or more tenant credentials for the first public cloud, and wherein, redirecting the request to the second public cloud network, further comprises redirecting the request to the second public cloud using the one or more tenant credentials for the second public cloud.

18. The cloud broker gateway device of claim 12, wherein the process, when executed by the processor, is further operable to:

receive a second request from the tenant associated with the enterprise network for at least one additional computing resource;

determine the hybrid cloud is established between the second public cloud and the enterprise network; and direct the second request to the second public cloud based on the hybrid cloud established between the second public cloud and the enterprise network.

19. A tangible, non-transitory, computer-readable media having software encoded thereon, the software, when executed by a processor, operable to:

receive, by a cloud broker gateway that interfaces with an enterprise network and one or more public cloud networks, a request from a tenant associated with the enterprise network for one or more computing resources;

direct the request to a first public cloud of the one or more networks based on a brokerage policy for the tenant;

receive a response indicating the first public cloud cannot provide the one or more computing resources;

redirect the request to a second public cloud of the one or more public clouds based on the brokerage policy for the tenant when the response indicates the first public cloud cannot provide the one or more computing resources; and establish a hybrid cloud that provides access to the one or more computing resources between the second public cloud and the enterprise network, the cloud broker gateway configured to act as a proxy for the tenant to dynamically secure the one or more computing resources.

20. The tangible, non-transitory, computer-readable media of claim 19, wherein, the software, when executed by a processor, is operable to:

map one or more representational state transfer (REST) return codes to a trigger event that causes the cloud broker gateway to redirect the request to one of the one or more public cloud networks, and wherein the response indicating the first public cloud cannot provide the one or more computing resources includes at least one REST return code.

* * * * *